United States Patent [19]

Chen

[11] Patent Number: 5,016,528
[45] Date of Patent: May 21, 1991

[54] BAKING APPARATUS

[76] Inventor: Tsai-An Chen, 201, Sec. 3, Ba-Dar Road, Taipei, Taiwan

[21] Appl. No.: 540,799

[22] Filed: Jun. 20, 1990

[51] Int. Cl.⁵ .......................... A21B 5/00; A47J 37/00
[52] U.S. Cl. ...................................... 99/353; 99/373; 99/427; 99/443 C
[58] Field of Search ...................... 99/373, 423, 443 C, 99/353, 404, 354, 355, 426, 427, 432, 450.1; 425/294, 439, 453; 426/509, 512

[56] References Cited

U.S. PATENT DOCUMENTS

| | | | |
|---|---|---|---|
| 1,477,842 | 12/1923 | Narobe | 99/373 |
| 4,004,129 | 1/1977 | Hicks | 99/443 C |
| 4,111,109 | 9/1978 | Sakurazawa | 99/353 |
| 4,195,559 | 4/1980 | Bardsley et al. | 99/427 |
| 4,207,810 | 6/1980 | Noel | 99/373 |
| 4,274,331 | 6/1981 | Jensen et al. | 99/373 |
| 4,535,687 | 8/1985 | Antpohler | 99/355 |
| 4,711,166 | 12/1987 | Chen | 99/450.1 |
| 4,854,226 | 8/1989 | Chen | 99/353 |

FOREIGN PATENT DOCUMENTS 2197173  5/1988  United Kingdom ................. 99/353

Primary Examiner—Timothy F. Simone
Attorney, Agent, or Firm—Morton J. Rosenberg; David I. Klein

[57] ABSTRACT

A baking apparatus includes cover molds and pan molds having recesses adapted to be engaged to define baking chamber as the cover and pan molds engage, a device for feeding dough into the recesses of the molds and a device for shaping the doughs in the recesses of the molds into desired shape. The engaged cover and pan molds containing shaped doughs are fed into an oven for baking treatment and discharged therefrom for air cooling and separating the cover mold from the pan mold for unloading baked confections.

4 Claims, 11 Drawing Sheets

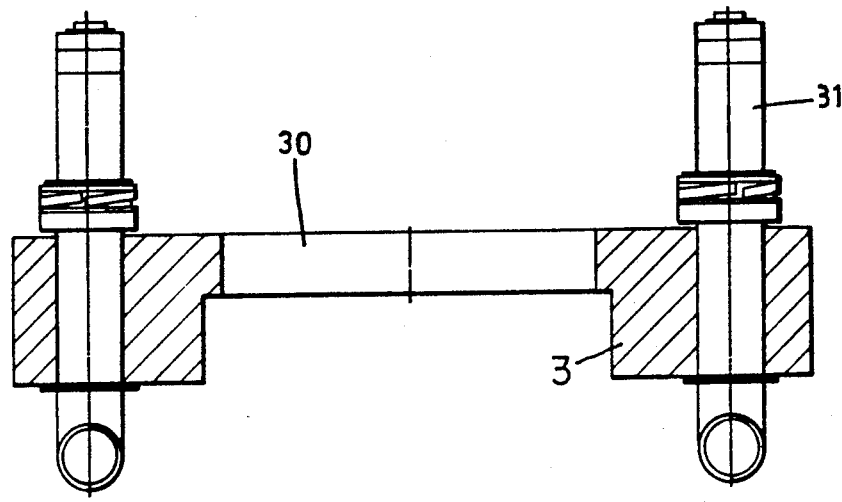
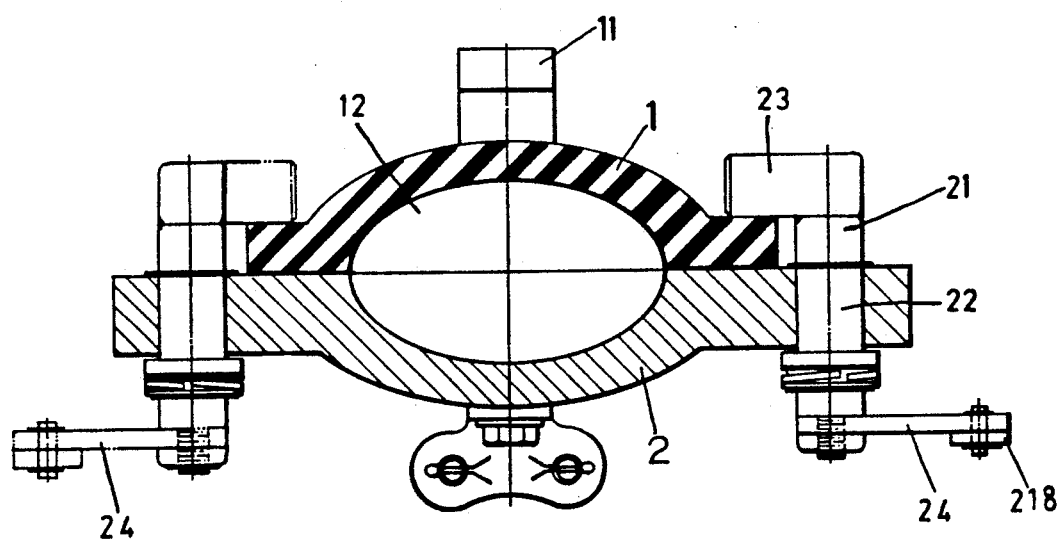
FIG.3

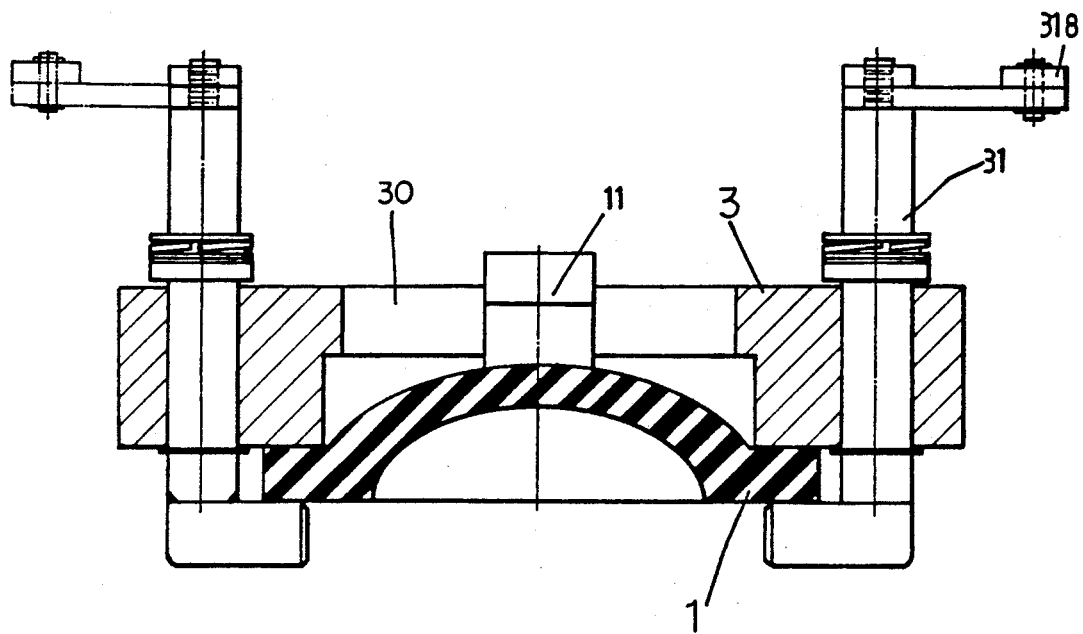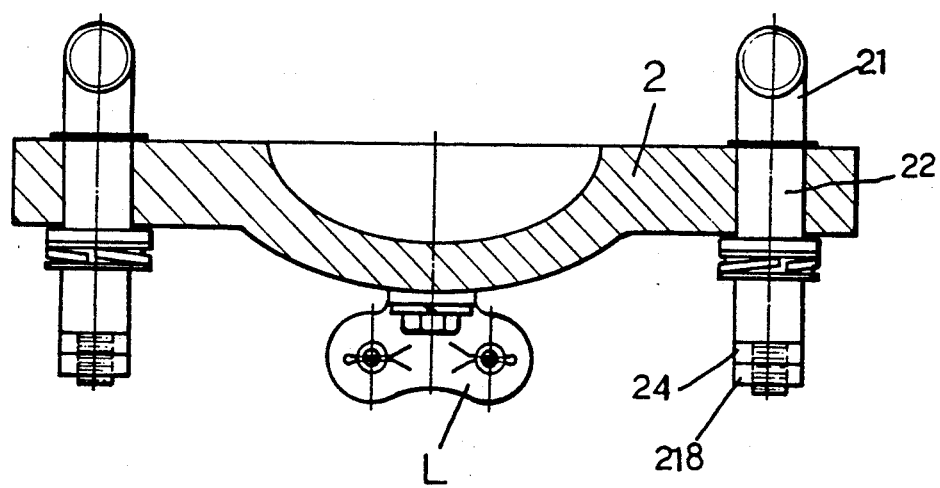
FIG.6

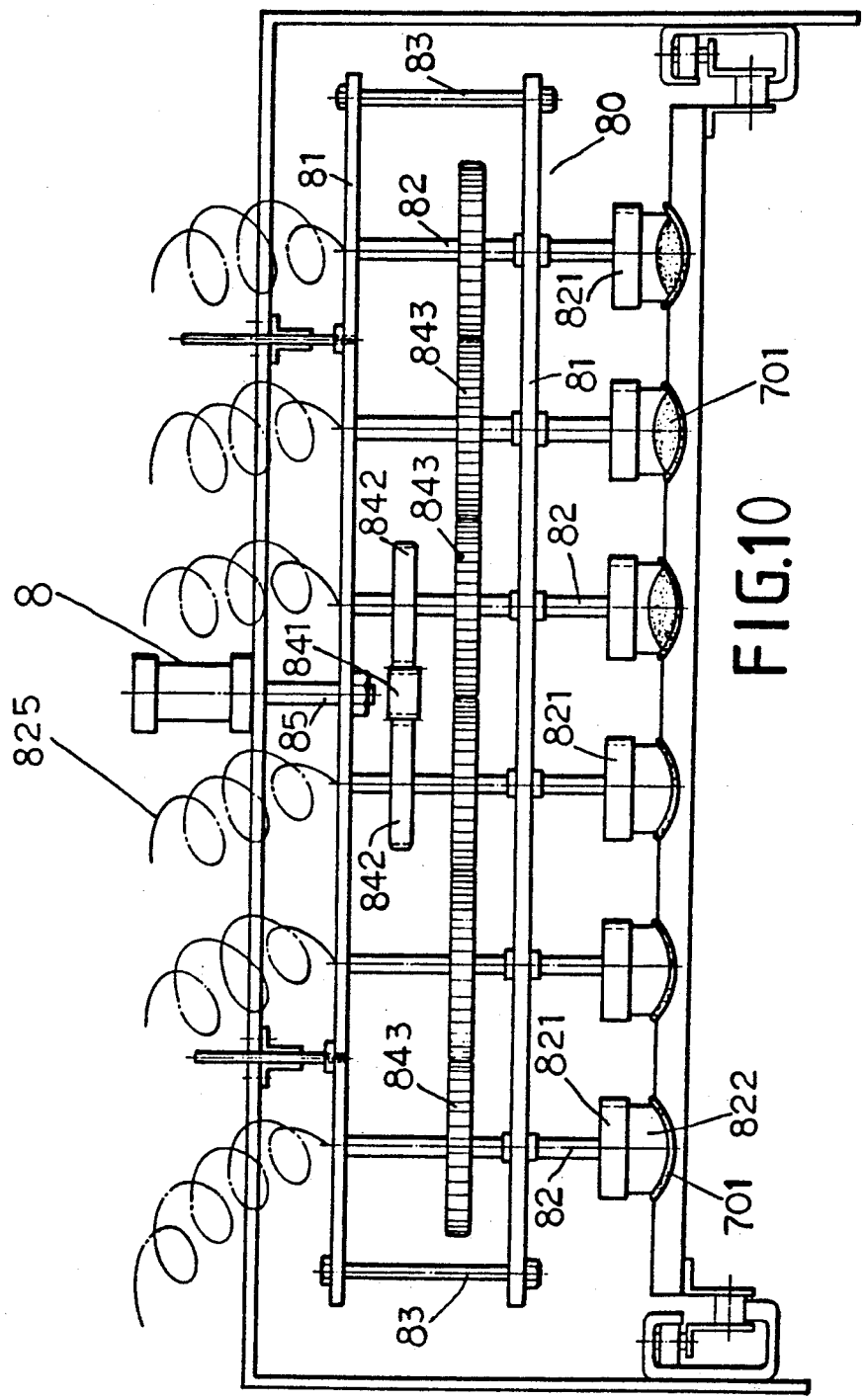

BAKING APPARATUS

BACKGROUND OF THE INVENTION

The present invention relates to improvement of an apparatus for making baked goods such as cakes, bread and bun.

The conventional baking equipment used in a bakery or confectionary factory to bake bread, bun or cakes includes a conveyor 20 to 60 meters long on which cake and bread pans are transported. The bread, cakes and bun are baked by heat sources arranged along the conveyor. This eqipment is very large and occupies a large floor space.

OBJECTS OF THE INVENTION

It is therefore an object of this invention to avoid the above noted drawbacks and to provide a baking apparatus which enables automatic and uniform baking of a large quantity of dough.

It is another object of this invention to provide a baking processing apparatus for making baked goods which is simple in operation.

BRIEF DESCRIPTION OF THE DRAWINGS

FIG. 6 is a cross-sectional view of separated cover and pan molds wherein the cover mold is carried by the carrier shown in FIG. 3;

FIG. 9-1 is a top elevation of the apparatus for feeding the dough balls through hoppers;

FIGS. 10-1, 10-2 and 10-3 show a series of embodiments of molded heads to be used in the pattern apparatus for forming dough balls into desired shapes.

DETAILED DESCRIPTION OF THE PREFERRED EMBODIMENT

Figure 1:
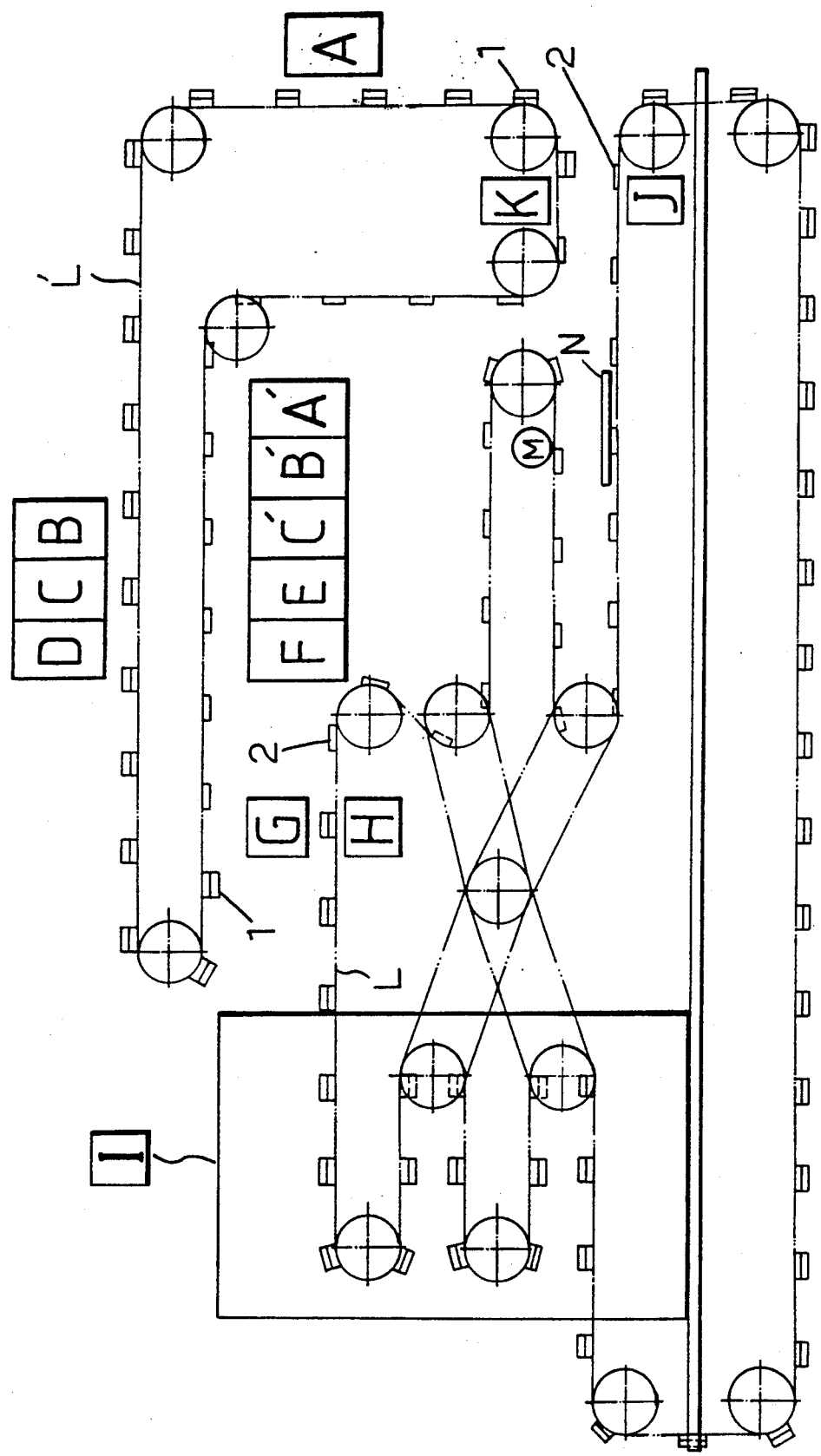
FIG. 1 is a diagrammatic view of the embodiment of a baking process of the present invention.

Referring now to FIG. 1, the operating process of the preferred embodiment of the present invention includes an A section for brushing to clean and laying a proper amount of cooking oil in top recesses of a cover mold, a B section for feeding dough into the recesses of the mold, a C section for shaping the dough in the recesses into upper or semi-portion of confections such as cakes and buns, a D section for spraying water to moisten the shaped dough, an A' section for brushing to clean and laying a proper amount of cooking oil in recesses of a pan mold, a B' section for feeding dough into the recesses of the pan mold, a C' section for shaping the dough in the recesses of the pan mold into lower or semi-portion of the confections, a E section for feeding insert on the shaped doughs contained in the recesses of the pan mold, a F section for trimming the dough, a G section for engaging the cover and pan molds of which the recesses containing shaped doughs which are unified into confections containing inserts therein, and a H section for securing said engaged cover and pan molds in place. Said engaged cover and pan molds are fed into an oven I for baking treatment. Pan recovery sections J, K are provided in which the secured cover and pan molds are unlocked in the J section and are separated in the K section and the baked confections are taken from the recesses of the pan mold which is positioned upside-down here through vibration at a M section. Said baked confections drop onto a conveyer N for collecting the confections to be packed and the cover mold and pan mold with empty recesses are fed again into their initial section A, A' respectively.

Figure 2:
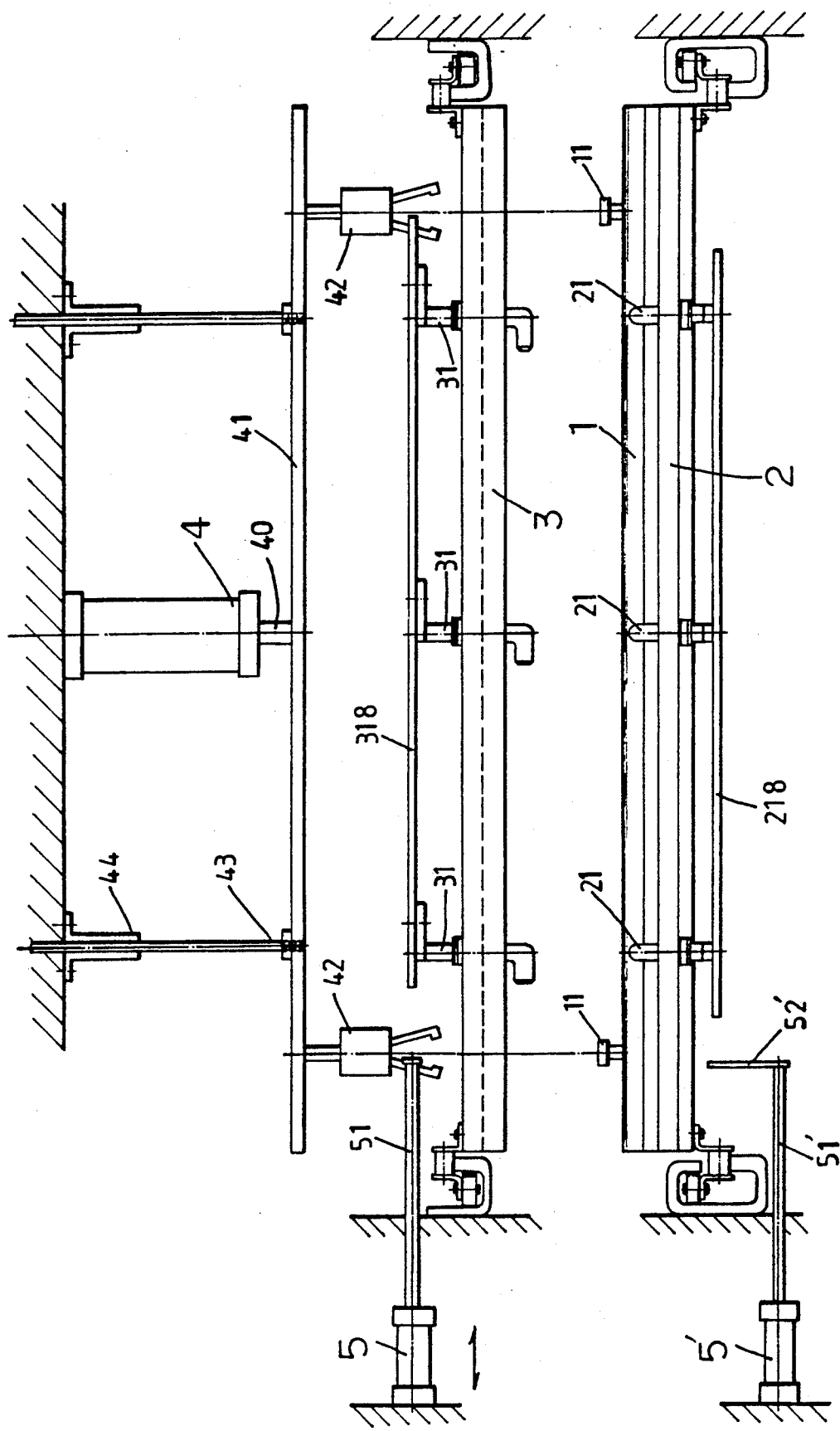
FIG. 2 is a front elevation of an apparatus for engaging and locking a cover mold and a pan mold.
Figures 1, 10:
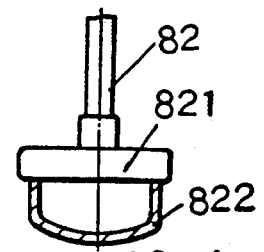
FIG. 10 is a front elevation of a pattern apparatus for forming dough balls in the recesses of the cover mold or pan mold into desired shape.
Figures 2, 10:
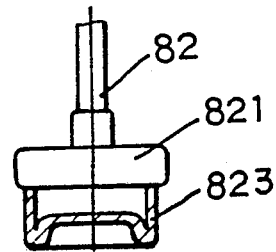
Figures 3, 10:
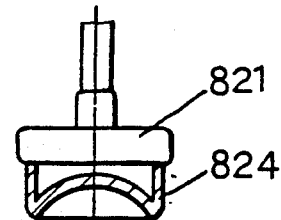
FIG. 3 is a cross-sectional view of engaged and locked cover and pan molds and a carrier for carrying the cover mold into a position ready for treatment of engaging with the pan mold.

Referring to FIGS. 2 and 3, the engaging and locking operations to match recesses of the cover and pan molds in an unifying position at G and H sections are mainly completed by a hydraulic cylinder which has an actuating rod 40 with its front end attached to a central portion of a supporting board 41 two sides of which is correspondingly assembled with guiding devices and claws 42. Said guiding devices includes rods 43 extending upwardly from the supporting board 41 and a guider 44 slidably sleeved around the rod 43 for balancing the board 41 to be lifted and descended smoothly. A cover mold carrier 3 which carries the cover mold 1 from the A section to this G section by means of a series of L-shaped retainers 31 which carry the cover mold 1 by engaging bottom edges thereof with lower horizontal ends of the retainer 31 and have vertical shanks turnably mounted in the elongated body of the carrier 3. Top ends of the retainers 31 are provided with levers with outer ends thereof pivoted to an actuating bar 318 which can be pushed by an actuating rod 51 of a side cylinder 5 to orient the retainers 31 from a first position where the lower ends of the retainers 31 engage the bottom edge of the cover mold 1 to a second position where the lower ends of the retainers 31 release from the cover mold 1.

As shown in FIGS. 2 and 3, at G section, the claws 42 extending through openings 30 formed in the elongated body of the carrier 3 seize T-heads 11 solidly mounted on two sides of the cover mold 1 to hold the cover mold 1, and the first side cylinder 5 actuates to push the actuating bar 318 so that the cover mold 1 is released from the carrier 3. Then the hydraulic cylinder 4 actuates to descend the supporting board 41 together with the cover mold 1 through the claws 42. Said cover mold 1 is thus placed on a corresponding pan mold 2 and the claws 42 release the T-heads 11 of the cover mold 1 and the hydraulic cylinder 4 is retracted to lift the supporting board 41 together with the claws 42 back to its original position.

Figure 4:
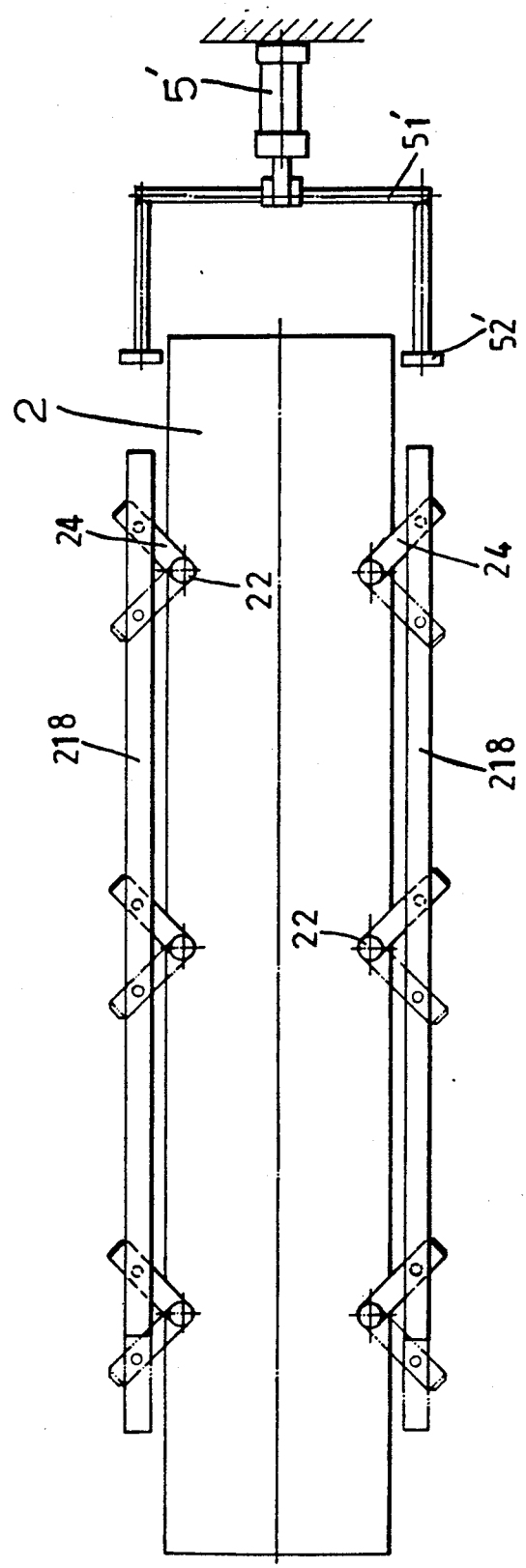
FIG. 4 is a diagrammatic top view of an actuating device and an actuating bar for orienting a series of locking members to lock the cover mold in place on the pan mold.

The cover mold 1 is placed on the pan mold 2 and further secured in placed by means of a series of locking members 21. Said locking members 21 are similar to the retainers 31 of the cover mold carrier 3 and of reverse "L" in shape each of which has a shank 22 turnably mounted in side portion of the pan mold 2 and top horizontal end 23 adapted to engage top edge of the cover mold 1. Lower ends of the locking members 21 are provided with levers 24 with outer ends thereof pivoted to an actuating bar 218 which can be pushed by an actuating rod 51' through a vertical arm 52' of a second side cylinder 5' to orient the locking members 21 from a first position where the top ends 23 of the locking members 21 engage the top edge of the cover mold 1 to a second position where the top ends of the locking members 21 disengage the cover mold 1, as shown in FIG. 4.

The engagement of the cover mold 1 and the pan mold 2 defines a plurality of chambers 12 inbetween for accommodating doughs of confections unified with upper and lower semi- portions which contain the insert. The engaged cover and pan molds carrying doughs of confections are fed into the oven I for backing treatment and discharged from an outlet thereof for air cooling until arriving the J and K sections where the cover mold 1 is to be unlocked and further separated from the pan mold 2.

Figure 5:
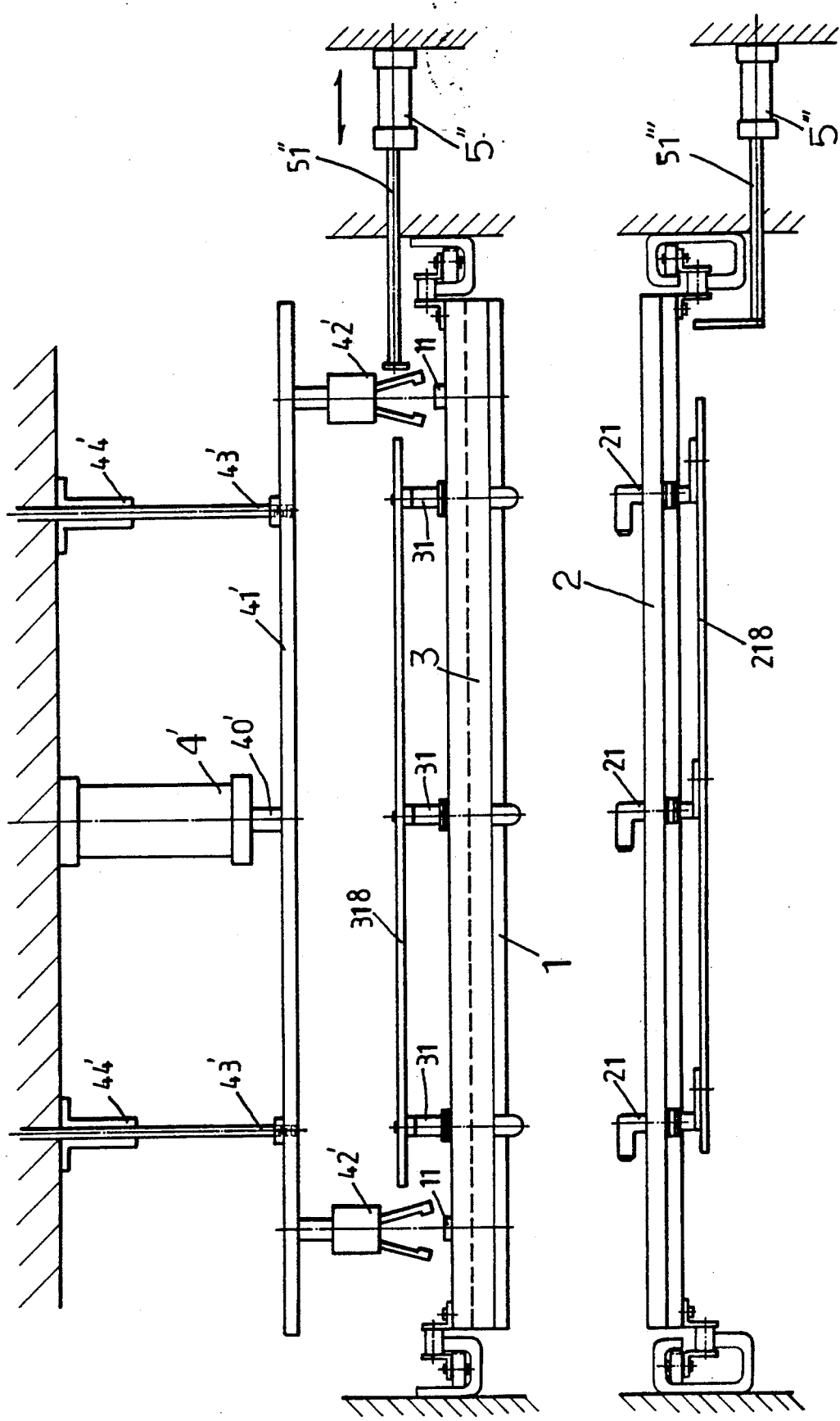
FIG. 5 is a front elevation of an apparatus for unlocking and separating the cover mold from the pan mold.

Apparatus for unlocking the cover mold 1 and separating it from the pan mold 2 is similar to the apparatus shown in FIGS. 2 and 3. As shown in FIGS. 5 and 6, one end of an actuating rod 40' of a hydraulic cylinder 4' is attached to a central portion of a supporting board 41' which is correspondingly provided with a pair of guiding devices including rods 43' and guider 44' for balancing up and down movements of the supporting board 41' and a pair of claws 42'. A third and a fourth side cylinders which are all the same in construction yet reverse in their actuating directions as the first and second side cylinders 5, 5' are provided in this section for operations of unlocking and carrying the cover mold 1. The actuating rod 51''' of the fourth side cylinder 5''' is actuated to push the actuating bar 218 of the pan mold 2 from its second position back to its first position that orients the locking members 21 to disengage the cover mold 1. Then the hydraulic cylinder 4' actuates to descend the supporting board 41' together with the claws 42'. The claws 42' seize the T-heads 11 of the cover mold 1 through the openings 30 in the elongated body of the carrier 3 and lift it up to a proper height so as to separate it from the pan mold 2. Thereafter, the actuating rod 51'' of the third side cylinder is actuated to push the actuating bar 318 from its second position back to its first position that orients the retainers 31 to hold the cover mold 1. The cover mold 1 is conveyed by a chain L' into the A section for preparation and the pan mold 2 carrying baked confections is conveyed to a position where the pan mold 2 is positioned up-side-down and a vibrating motion is conducted to the pan mold 2 by means of a motor M for taking out the confections.

Figure 8:
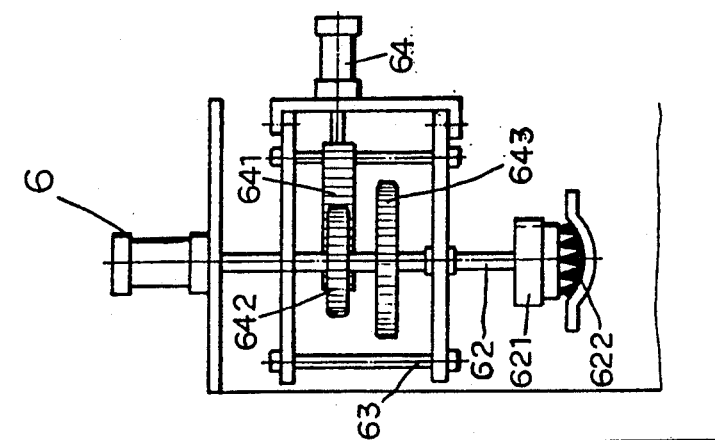
FIG. 8 is a side elevation of the apparatus shown in FIG. 7.
Figure 7:
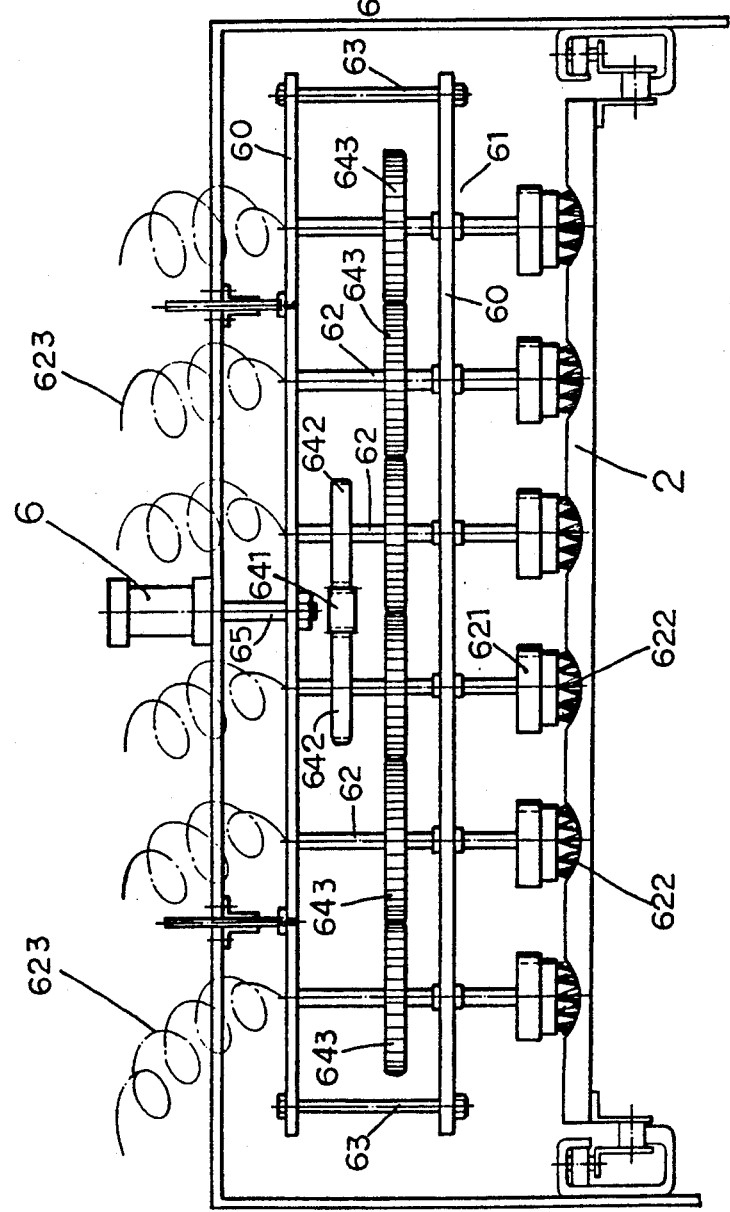
FIG. 7 is a front elevation of an apparatus for brushing to clean and feeding cooking oil into recesses of the pan mold.

Referring to FIGS. 7 and 8, the apparatus for brushing to clean the recesses of the pan mold 2 includes a frame 61 constituted with a pair of spaced elongated bars 60 and side bars 63. One end of an actuating rod 65 of a hydraulic cylinder 6 is attached to a middle portion of the top bar 60 of the frame 61. The apparatus is also correspondingly provided with a pair of guiding devices, which is similar to the guiding devices shown in FIGS. 2 and 5, for balancing up and down movements of the frame 61. A plurality of rotary shafts 62 are rotatably mounted in the frame 61 at equal intervals and provided with gears 643 engaging with respect to each other. Two adjacent shafts 62 are provided with pinions 642 of which teeth engage teeth formed in two sides of a rack 641. Said rack 641 is actuated to reciprocate by means of a cylinder 64. By so doing, all the shafts 62 are driven to rotate clockwise and counterclockwise alternately through engaging gears 643. A plurality of brushes 621 having bristles 622 abutting against the recesses of the pan mold 2 are attached to lower ends of the shafts each of which has an oil passage (not shown) running through the shafts 62 and the brushes 621 for feeding cooking oil into the recesses of the pan mold 622 through a connecting pipe 623 which is led to an oil source (not shown).

Figure 9:
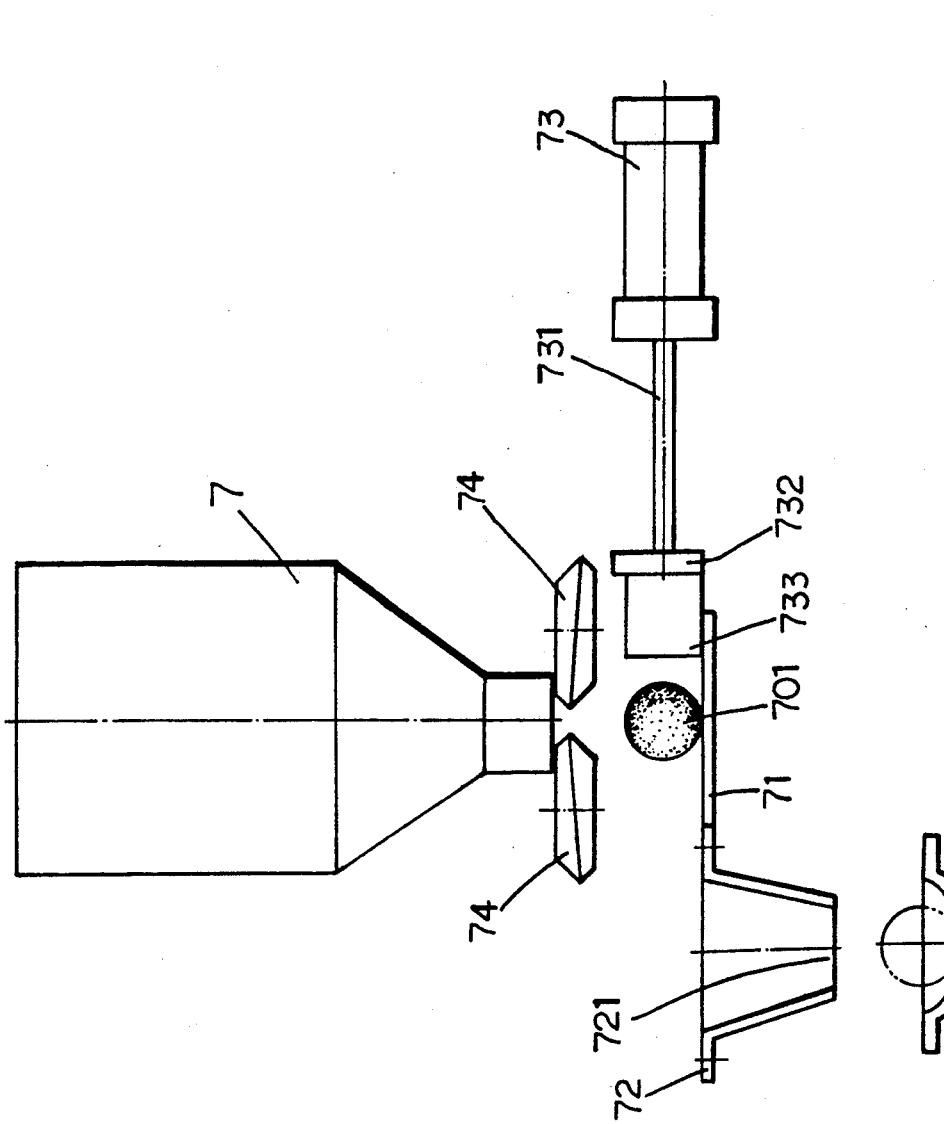
FIG. 9 is a side elevation of an apparatus for shaping dough into a ball and feeding the dough ball into a recess of the cover mold.
Figures 1, 9:
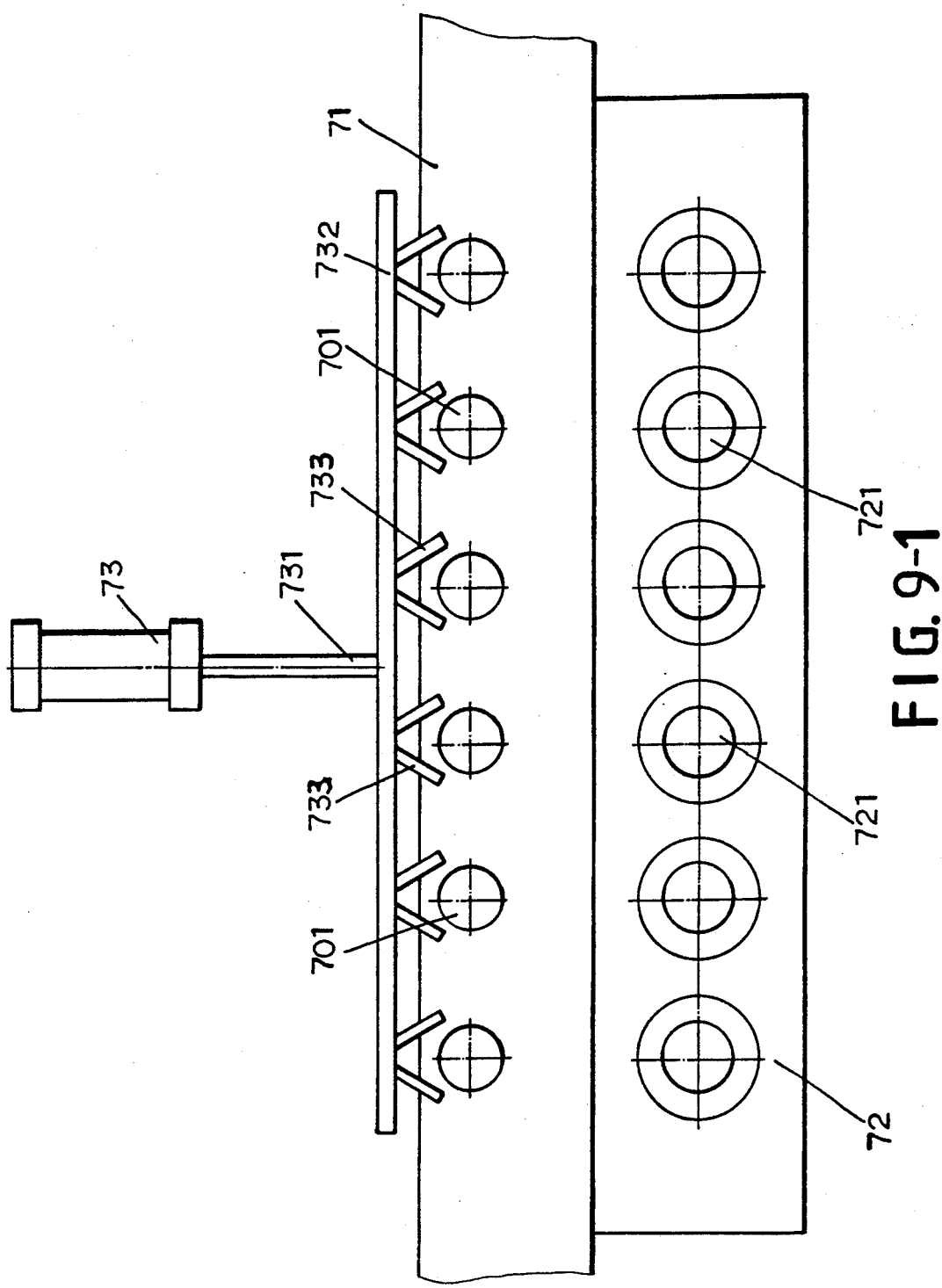

Referring to FIGS. 9 and 9-1, a pair of rotary blades 74 are disposed under a hopper 7 in which the raw dough is placed. The dough in the hopper 7 drops downwardly between the rotary blades 74 and is cut and rolled into a dough ball 701 which rests on a conveyer 71 extending transversely and abutting against one side edge of a series of second hoppers 72. Said conveyer 71 distributes a plurality dough balls 701 correspondingly in front of the second hoppers 72, as shown in FIG. 9-1. The cover mold 1 is disposed under the series of hoppers 72 in an up-side-down state with its recesses corresponding to outlets 721 of the second hoppers 72. One end of an actuating rod 731 of a cylinder 73 is attached to a bracket 732 of which the front end is formed with a series of fork-like members 733 right behind the dough balls 701. The cylinder 73 actuates to push the bracket 732 forward so as to push the dough balls 701 into corresponding second hoppers 72. By so doing, the dough balls 701 drop into the recesses of the cover mold 1 through outlets 721 of the second hoppers 72.

Figure 11:
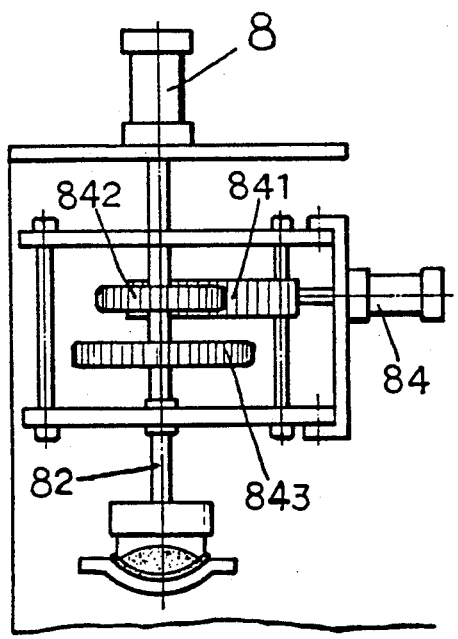
FIG. 11 is a side elevation of the pattern apparatus shown in FIG. 10.

Referring to FIGS. 10 and 11, a pattern device for forming dough balls 701 into desired shape is similar in construction to the apparatus for brusing to clean the recesses of the pan mold 2, as shown in FIG. 7. The pattern device includes a frame 80 constituted with a pair of spaced elongated bars 81 and side bars 83. One end of an actuating rod 85 of a hydraulic cylinder 8 is attached to a middle portion of the top bar 81 of the frame 80. The device is also correspondingly provided with a pair of guiding devices, which is similar to the guiding devices shown in FIGS. 2 and 5, for balancing up and down movements of the frame 80. A plurality of rotary shafts 82 are rotatably mounted in the frame 80 at equal intervals and provided with gears 843 engaging with respect to each other. Two adjacent shafts 82 are provided with pinions 842 of which teeth engage teeth formed in two sides of a rack 841. Said rack 841 is actuated to reciprocate by means of a cylinder 84. By so doing, all the shafts 82 are driven to rotate clockwise and counterclockwise alternately through engaging gears 843. A plurality of pattern heads 821 having molded end 822 extending into corresponding recesses of the cover mold 1 are attached to lower end of the shafts 82 each of which has a water passage (not shown) running through the shafts 82 and molded head 821 for spraying water onto the shaped dough 701 through a water pipe 825 leading from a water source and being connected to upper end of the shaft 82 for moistening the shaped dough 701. Said dough 701 can be shaped into desired shape by selecting to use pattern heads 82 of different molded ends 822, 823, 824, as shown in FIGS. 10-1, 10-2 and 10-3.

While the invention has been described with what is presently considered to be the most practical and preferred embodiment, it is to be understood that the invention is not to be limited to the disclosed embodiment, but on the contrary, is intended to cover various modifications and equivalent arrangements.

What is claimed is:

1. A baking apparatus comprising
    a first mold having top edges and bottom edges and formed with a plurality of semi-spherical recesses for insertion of dough therein and adapted to be positioned in a first position with the recesses facing upwardly and a second position with the recesses facing downwardly;
    a second mold formed with a plurality of semi-spherical recesses for insertion of dough therein, adapted to be positioned in a first position with recesses facing upwardly and a second position with the recesses facing downwardly and to be engaged with the first mold with the semi-spherical recesses thereof matching the semi-spherical recesses of the first mold to define spherical chambers therebetween as the first mold being positioned in its second position and the second mold being positioned in its first postion;
    T-shaped body members mounted on two side portions of the first mold;
    lifting means mounted above the second mold including displaceable claw devices, said lifting means having actuating means for moving it along a vertical direction between a first position where said claw devices can reach and seize the T-shaped body members on the first mold which rests on the second mold and a second position over the first position thereof for lifting the first mold into a third position;
    cover mold carrying means having an elongated body and a plurality of L-shaped retainer members with vertical shafts thereof rotatably mounted in the elongated body, said L-shaped retainer members being orientable between a first position with lower ends connected to the shafts engaging the bottom edges of the first mold as it is being positioned in its third position and a second position with said lower ends thereof disengaging the first mold thus positioned;
    an oven having an inlet through which engaged first and second molds enter and an outlet through which engaged first and second molds exit; and,
    conveyer means adapted to transport the engaged first and second molds into and out from the oven along an endless route.

2. A baking apparatus as claimed in claim 1 wherein the apparatus is further provided with a dough ball feeding device comprising a first hopper for containing dough having an outlet end, blade means disposed under the outlet end of the first hopper for cutting dough dropping from the first hopper and shaping cut doughs into balls, a series of second hoppers aligned in a row below the outlet end of the first hopper and having outlet ends corresponding to semi-spherical recesses of the first mold located in its first position and the second mold located in its first position under the second hoppers, conveyer means abutting second hoppers and adapted to distribute dough balls adjacent the second hoppers and actuating means adapted to push the dough balls into the second hoppers for dropping the balls into recesses of the first and second molds.

3. A baking apparatus as claimed in claim 1 wherein, the apparatus is further provided with a pattern device for forming dough in the recesses of the first and second molds into desired shape comprising:
    a frame;
    actuating means for shifting the frame along a vertical direction;
    a plurality of shafts rotatably mounted in the frame and extending along a vertical direction;
    gear members sleeved around the shafts and engaging with respect to each other;
    two pinions sleeved around two adjacent shafts of said shafts and defining a gap inbetween;
    a rack adapted to reciprocate through the gap between the pinions and having two sides arranged tangentially with respect to the pinions, said two sides of the rack being formed with teeth engageable with teeth of the pinions;
    means for actuating the rack to reciprocate through the gap between the pinions; and
    a plurality of molded heads attached to bottom ends of the shafts and having bottom molded ends adapted to extend into recesses of the first and second mold located under the frame thereof.

4. A baking apparatus as claimed in claim 1 wherein the apparatus further includes brushing means for cleaning the recesses of the first and second molds comprising:
    a frame;
    actuating means for shifting the frame along a vertical direction;
    a plurality of shafts rotatably mounted in the frame and extending along a vertical direction;
    gear members sleeved on the shafts and engaging with respect to each other;
    a pair of pinions sleeved on two adjacent shafts of said shafts and defining a gap inbetween;
    a rack adapted to reciprocate through the gap between the pinions and having two sides arranged tangentially with respect to pinions, said two sides of the rack being formed with teeth engageable with teeth of the pinions;
    means for actuating the rack to reciprocate through the gap between the pinions; and,
    a plurality of brushes attached to bottom ends of the shafts and having bottom bristles extending into recesses of the first and second mold located under the frame thereof.

* * * * *